United States Patent Office 2,715,644

Patented Aug. 16, 1955

2,715,644

PURIFICATION OF SODIUM GENTISATE

William B. Wright, Jr., Plainfield, James M. Smith, Jr., North Plainfield, and Kenneth H. Collins, Plainfield, N. J., assignors to American Cyanamid Company, New York, N. Y., a corporation of Maine No Drawing. Application July 12, 1951, Serial No. 236,472

2 Claims. (Cl. 260—521)

This invention relates to an improved method of purifying sodium gentisate (that is to say, the mono-sodium salt of 2,5-dihydroxybenzoic acid).

Gentisic acid is becoming of increasing importance as a better tolerated analgesic and antipyretic drug used in rheumatic fever and arthritides and this has raised the questions of economical production and of purity. In many ways, the second question is the most important, because, for medicinal use, over protracted periods of time, a product of very high purity and light color is essential. In the past, crude sodium gentisate has been prepared by the reaction of 5-bromo-salicylic acid with dilute caustic soda and a cupriferous catalyst at high temperatures requiring an autoclave. Isolation and purification of the sodium gentisate resulting was effected by acidifying to liberate free gentisic acid and then extraction of the highly water-soluble product with an organic solvent, such as ether. Considerable loss has resulted from the purification method and the product has not been of the highest purity and lightest color.

An improved method of preparing crude sodium gentisate is described and claimed in our copending application, Serial No. 236,471, filed July 12, 1951, now abandoned. In this improved process, the temperature of hydrolysis is reduced to 100–110° C., much stronger caustic soda is used, from 10–25%, and a very much smaller amount of cupriferous catalyst was found necessary, less than one tenth of one percent of the amount formerly used. The improved process of preparing crude sodium gentisate results in marked economies because of a much higher yield of crude product and a purer crude product.

According to the present invention, we have found that if the solution of crude sodium gentisate is adjusted to about pH 6–7, and if necessary, concentrated under a vacuum, the mono-sodium salt of gentisic acid can be precipitated by cooling and recovered cheaply and effectively by filtration. This process results in a much purer product and a greater efficiency. Apparently, a number of the impurities, such as small amounts of starting material, or by-products, and some of the colored impurities, are soluble in a neutral or slightly acid reaction mixture and are eliminated, whereas when the old process is used, in which acidification is carried out up to the point where gentisic acid is formed and the latter is then extracted with an organic solvent, many of the impurities show considerable solubility in the organic solvent and are carried along with the gentisic acid, resulting in a less pure product.

The filter cake which results from a filtration of the sodium gentisate solution still contains a good deal of mother liquor with resulting impurities. It is, of course, impractical to wash with water, because the sodium gentisate is too soluble. Accordingly, in the second step of the present invention, washing is effected with a concentrated, preferably saturated, salt solution. Almost any non-toxic salt may be used, such as sodium chloride. We have found it more desirable in some instances in the final step to use a cold solution of sodium gentisate (about 5 to 7%) because this will not introduce inorganic salts. This procedure constitutes the preferred method and results in a material improvement in color.

It is necessary to dry the washed sodium gentisate and this may be effected by conventional means at moderate temperatures, care being taken as in all of the steps producing sodium gentisate that oxidation is avoided. In order to speed drying, we find that the addition of a small amount of a volatile organic liquid, such as diethyl ether or isopropyl acetate improves the drying and prevents fusion of the cake during the drying procedure. The use of the organic liquids should not be confused with the old process in which gentisic acid was extracted with an organic liquid. In the present process, the organic liquid is merely used to aid the removal of moisture at a more rapid rate and under conditions which result in an improved product. Any organic liquid which forms low boiling azeotropes with water may be used effectively. This modification constitutes a preferred specific procedure.

The purified sodium gentisate of the present invention may be used to prepare pure gentisic acid by dissolving in water, clarifying with decolorizing carbon if desired, acidifying, and filtration. The pure gentisic acid has sufficiently low solubility in water so that the filter cake may be washed with water. It can be dried conveniently at 50–65° C.

While, as pointed out above, the improved process of preparing sodium gentisate with lower temperatures, increased caustic concentration, and lowered amount of cupriferous catalyst is not claimed in the present application, it does produce an improved crude sodium gentisate, which, when treated by the purification process of the present invention, produces a superior product. The present invention, therefore, includes purification of sodium gentisate prepared by the improved process of our copending application, as well as the purification of sodium gentisate prepared by other means. The preparation is, however, not claimed in the present application, apart from the step of purification.

The invention will be described in greater detail in conjunction with the following specific examples, parts being by weight.

*Example 1*

A mixture of 65.1 parts of 5-bromosalicylic acid, 40.5 parts of 98% sodium hydroxide, 224 parts of water and 0.06 part of copper powder is refluxed under a non-oxidizing atmosphere, such as nitrogen, until reaction is complete. This particular reaction mixture refluxes at approximately 106° C. After the reaction is complete, the mixture is filtered, acidified with hydrochloric acid to a pH of 6–7 and concentrated under vacuum to 200 parts by volume. A little sodium hydrosulfide is added to prevent oxidation and the reaction mixture is cooled to 0° C. and filtered. The filter cake, which is essentially sodium gentisate, is then washed with 40 parts of a cold, saturated, salt solution. The cake is then dissolved in 75 parts of water, decolorizing charcoal added, acidified with 20 parts by volume of concentrated hydrochloric acid and cooled. Gentisic acid is precipitated, washed with water, dried at 55–60° C. The product melts at 201–202° C.

*Example 2*

A mixture of 217 parts of 5-bromosalicylic acid, 135 parts of 98% sodium hydroxide, 745 parts of water and 0.35 part of copper powder is heated at reflux under a nitrogen atmosphere until reaction is complete The mixture is then filtered, the pH adjusted to 6–7 with acid, the liquid cooled to —3° C. A precipitate forms which is filtered off and washed with 140 parts by volume of a cold, saturated salt solution. Thereupon, the cake is suspended in 200 parts of water, decolorized with a charcoal at 70° C., acidified with 64 parts by volume of concentrated hydrochloric acid, cooled to 0–3° C. and filtered. The filter cake is washed with water, dried at 55–60° C. and constitutes gentisic acid having a melting point of 203.5–204.5° C. The yield is about 5% less than in Example 1.

*Example 3*

A mixture of 65.1 parts of 5-bromosalicylic acid, 40.5 parts of 98% sodium hydroxide, 355 parts of water and 0.1 part cuprous chloride is heated at reflux until reaction is complete. The time required is approximately twice as long as for Example 1 for batches of comparable size. After the reaction is complete, the mixture is filtered and the filtrate divided into two parts. The first part is worked up as described in Example 1. The yield is the same as in Example 2 and a gentisic acid is produced having a melting point of 202–204° C.

The second portion of the filtrate is acidified to a pH of 1–2 by the use of concentrated hydrochloric acid and is then extracted with isopropyl acetate. The extract is then concentrated, giving a crude gentisic acid melting at 194–197° C. The yield by the extraction procedure is just under 95%.

*Example 4*

A crude sodium gentisate corresponding to 6.16 parts of gentisic acid of a purity corresponding to a melting point 196–199° C. was dissolved in water at a pH of 6–7, the volume amounting to 20 parts. The solution was treated with decolorizing carbon, cooled to 0° C., filtered, the precipitate washed with ether and oven dried at 55–60° C. The sodium gentisate precipitate was then acidified to produce gentisic acid, which was recovered by filtration, washed and dried. It had a melting point of 204–205° C.

The same procedure was carried out on a crude sodium gentisate representing gentisic acid of a purity corresponding to a melting point of 202–204° C. More than a third larger yield was obtained and the final product was gentisic acid having a melting point of 205–206° C. If the sodium gentisate is recrystallized once again from water before acidification, the corresponding gentisic acid melted at 206.5–207° C.

It will be apparent from the above example that although the process of the present invention will work with any crude sodium gentisate, there is a distinct advantage in starting with the higher grade crude which is obtainable by the improved process of our copending application referred to above In the examples, temperatures of about 0° C. have been described. However, the exact temperature is not critical and acceptable results may be obtained up to about 10° C. Where feasible however, it is desirable to keep the temperature near 0.

We claim:

1. A process of purifying sodium gentisate which comprises precipitating sodium gentisate from an aqueous solution thereof having a pH from 6 to 7 at a temperature not exceeding 10° C., recovering the precipitated sodium gentisate by filtration and washing the precipitated sodium gentisate with a cold, saturated aqueous salt solution.

2. A process according to claim 1 in which the salt solution is a water solution of sodium gentisate.

References Cited in the file of this patent

UNITED STATES PATENTS

| | | |
|---|---|---|
| 1,755,362 | Putnam | Apr. 22, 1930 |
| 2,588,679 | Williams | Mar. 11, 1952 |

OTHER REFERENCES

Morton: Lab. Technique in Org. Chem. (McGraw-Hill), pp. 9–11 (1938).